United States Patent
Missioux et al.

(10) Patent No.: US 12,168,947 B2
(45) Date of Patent: Dec. 17, 2024

(54) MOTOR VEHICLE SENSOR DIAGNOSTICS AND CLEANING METHOD

(71) Applicant: VITESCO TECHNOLOGIES GMBH, Regensburg (DE)

(72) Inventors: Hugo Missioux, Toulouse (FR); Nicolas Oberti, Toulouse (FR)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 0 days.

(21) Appl. No.: 18/292,741

(22) PCT Filed: Sep. 2, 2022

(86) PCT No.: PCT/EP2022/074476
§ 371 (c)(1),
(2) Date: Jan. 26, 2024

(87) PCT Pub. No.: WO2023/041351
PCT Pub. Date: Mar. 23, 2023

(65) Prior Publication Data
US 2024/0280043 A1    Aug. 22, 2024

(30) Foreign Application Priority Data
Sep. 14, 2021   (FR) ..................... 2109609

(51) Int. Cl.
*F02D 41/14*   (2006.01)
*F01N 11/00*   (2006.01)
(Continued)

(52) U.S. Cl.
CPC ........ *F01N 11/007* (2013.01); *F02D 41/1454* (2013.01); *F02D 41/222* (2013.01); *G01K 3/005* (2013.01); *G01M 15/104* (2013.01);

(58) Field of Classification Search
CPC ............ F01N 2560/025; F01N 11/007; F02D 41/1454; F02D 41/222; G01K 3/005; G01M 15/104
See application file for complete search history.

(56) References Cited

U.S. PATENT DOCUMENTS 7,950,222 B2 *  5/2011  Hodzen ................. F01N 3/0871
                                                                      123/703
9,518,954 B2 * 12/2016  Ishiguro ............. G01N 27/4175
(Continued)

FOREIGN PATENT DOCUMENTS

DE   102010029512 A1   12/2010
JP     2006336591 A    12/2006
(Continued)

OTHER PUBLICATIONS

International Search Report and Written Opinion of the ISA for PCT/EP2022/074476 mailed Dec. 8, 2022, 27 pages.

*Primary Examiner* — Gonzalo Laguarda
(74) *Attorney, Agent, or Firm* — NIXON & VANDERHYE

(57) ABSTRACT

This relates to a method for diagnosing a sensor for a motor vehicle, and to the vehicle, the method including: a) a step of detecting errors in the measurements taken by the sensor; b) a first phase of commanding the cleaning of the sensor; and c) a step of cancelling the detection of measurement errors by the sensor if the difference between the first variation in the richness level determined on the basis of the parameter relating to the pumping current and the second variation determined on the basis of the variation in the voltage across the terminals of the sensor is: i) less than a predefined maximum tolerance threshold; and ii) greater than a predefined minimum tolerance threshold.

12 Claims, 2 Drawing Sheets

(51) Int. Cl.
*F02D 41/22* (2006.01)
*G01K 3/00* (2006.01)
*G01M 15/10* (2006.01)

(56) References Cited

U.S. PATENT DOCUMENTS

| | | | |
|---|---|---|---|
| 9,658,185 B2 | 5/2017 | Paggel | |
| 11,125,176 B2 * | 9/2021 | Kluzner | ............. F02D 41/1475 |
| 2004/0187554 A1 | 9/2004 | Hattori | |
| 2005/0082279 A1 | 4/2005 | Kwon | |
| 2012/0001641 A1 | 1/2012 | Tsukada | |
| 2014/0012486 A1 | 1/2014 | Fey | |
| 2014/0238853 A1 | 8/2014 | Yoshida | |
| 2014/0278013 A1 | 9/2014 | Gibson | |
| 2015/0377822 A1 | 12/2015 | Yoshida | |
| 2016/0032812 A1 | 2/2016 | Lee | |
| 2016/0091459 A1 | 3/2016 | Jun | |
| 2016/0123842 A1 | 5/2016 | Yoo | |
| 2017/0082009 A1 | 3/2017 | Jang | |

FOREIGN PATENT DOCUMENTS

| | | |
|---|---|---|
| JP | 2008076190 A | 4/2008 |
| JP | 2009293466 A | 12/2009 |
| JP | 2010203787 A | 9/2010 |
| JP | 2015094331 A | 5/2015 |
| KR | 1020050121490 A | 12/2005 |
| KR | 1020060002157 A | 1/2006 |

* cited by examiner

[Fig. 1]

MOTOR VEHICLE SENSOR DIAGNOSTICS AND CLEANING METHOD

CROSS-REFERENCE TO RELATED APPLICATIONS

This application is the U.S. national phase of International Application No. PCT/EP2022/074476 filed Sep. 2, 2022 which designated the U.S. and claims priority to FR Patent Application No. 2109609 filed Sep. 14, 2021, the entire contents of each of which are hereby incorporated by reference.

TECHNICAL FIELD

The invention relates to the field of combustion engine vehicles, and more specifically to a method for diagnosing and cleaning a sensor configured to measure the amount of oxygen exiting the combustion engine of a vehicle.

PRIOR ART

In a known manner, the combustion engine of a vehicle is connected to an exhaust line, notably allowing the exhaust gases emitted during the combustion phase of the combustion engine to be discharged via an exhaust pipe. In addition, the exhaust line comprises a depollution system allowing the pollution from the exhaust gases emitted by the combustion engine to be reduced before they are discharged.

In addition, a sensor is mounted between the outlet of the combustion engine and the inlet of the depollution system and is notably capable of measuring the oxygen level in the exhaust gases. The oxygen level measured by the sensor allows the fuel richness level to be determined in the mixture of air and fuel injected into the engine.

Also in a known manner, the vehicle comprises an engine control unit, capable of controlling the various actuators of the combustion engine, notably the injectors, the air intake flaps, etc.

The control unit thus determines, on the basis of the oxygen level measured by the sensor, the amount of fuel to be injected into the combustion engine, so that the proportion between the amount of fuel and the amount of air is optimal during the combustion phase of the combustion engine, in order to ensure maximum efficiency of the combustion engine.

Before a sensor is installed in a vehicle, it is packaged in an inert atmosphere. In other words, the sensor is kept in an atmosphere made up of inert gases so as to prevent any oxidation of the measuring electrodes of the sensor. However, inert gases attach themselves to the sensor electrodes and are said to "pollute" the sensor.

When the sensor is installed in the vehicle, the control unit carries out a plausibility diagnosis of the sensor, in other words, the control unit detects whether or not the measurements taken by the sensor are relevant to each other and therefore whether the sensor is functioning correctly. When the measurements are not relevant to each other, the control unit systematically advises the vehicle user to replace the oxygen sensor, notably by displaying a warning light on the vehicle dashboard.

Thus, as a precaution, the vehicle user will replace the sensor or have it replaced, and this will involve costs, notably the cost of a new sensor or even the installation of the new sensor.

Detection of the irrelevance of the measurements taken by the sensor can be due to malfunctioning of the sensor itself or to the inert gases that have been deposited on the electrodes of the sensor. However, in the latter case, the inert gas pollution on the electrodes of the sensor is reversible and the sensor therefore will have been replaced unnecessarily, generating unnecessary costs and handling.

Therefore, a requirement exists for a solution for at least partly addressing these disadvantages.

DISCLOSURE OF THE INVENTION

The invention relates to a method for diagnosing a sensor for a motor vehicle, said vehicle comprising:
  a combustion engine;
    a depollution system fluidly connected to the engine and configured to depollute the exhaust gases originating from said engine;
    a sensor placed between the outlet of the engine and the inlet of the depollution system and configured to measure a parameter relating to the oxygen level in the exhaust gases exiting the engine, the sensor comprising two voltage measurement terminals;
  a computer comprising a memory zone, which stores the value of a counter; the method being characterized in that it comprises:
  a. a step of detecting errors in the measurements taken by the sensor;
  b. a first phase of commanding the cleaning of the sensor;
  c. a step of incrementing the value of the counter upon each command to clean the sensor;
  d. a second phase, following the cleaning of the sensor, comprising:
  i. controlling the operation of the combustion engine by continuously increasing the richness level setpoint transmitted to the combustion engine from a minimum value to a maximum value, with the richness level being defined by the ratio between the mass of fuel admitted into the combustion engine and the theoretical fuel mass requirement for the total combustion of said fuel for a predefined air mass injected into the combustion engine;
  ii. at the same time as the controlling step:
  1. measuring the variation in the parameter relating to the oxygen level;
  2. measuring the variation in the voltage between the voltage measurement terminals of the sensor;
  iii. a step of determining a first variation in the richness level on the basis of the variation in the parameter relating to the determined oxygen level;
  iv. a step of determining a second variation in the richness level on the basis of the measurement of the variation in the voltage between the voltage measurement terminals of the sensor;
  e. a step of cancelling the detection of measurement errors by the sensor if the difference between the first variation in the determined richness level and the second determined variation is:
  i. less than a predefined maximum tolerance threshold; and
  ii. greater than a predefined minimum tolerance threshold;
  f. otherwise, a step of confirming the detection of a malfunction of the sensor if the value of the counter is greater than a maximum threshold of predefined cleaning cycles.

The method thus allows a differentiation to be made between the case whereby the sensor is clogged by the inert gases present in the sensor storage area before the sensor is installed in the vehicle and a sensor malfunction that is not due to clogging. This means that the vehicle user will only be notified of a sensor malfunction when this is the case, rather than when the sensor is temporarily clogged. The vehicle user will replace the sensor only when necessary. In addition, if the sensor becomes clogged, the method allows the sensor to be cleaned.

Advantageously, the first phase of commanding the cleaning of the sensor designates controlling the operation of the combustion engine by periodically varying the richness level setpoint from the minimum value to the maximum value.

Even more preferably, the second phase comprises a sub-step of storing the first variation and the second variation in the richness level in the memory zone. In this way, the first variation and the second variation are preserved and can be compared by the computer in order to implement the cancellation step or the confirmation step.

Preferably, the first phase is implemented if the temperature in the depollution system is above a predetermined temperature threshold. This means that the optimum operating temperature has been reached in the depollution system.

The invention also relates to a computer program product, characterized in that it comprises a set of program code instructions which, when they are executed by one or more processors, configure the one or more processors to implement a method as described above.

The invention also relates to a computer for a vehicle, said vehicle comprising:
  a combustion engine;
    a depollution system fluidly connected to the engine and configured to depollute the exhaust gases originating from said engine;
    a sensor placed between the outlet of the engine and the inlet of the depollution system and configured to measure a parameter relating to the oxygen level in the exhaust gases exiting the engine;
  the computer being configured to communicate with the sensor, said computer comprising a memory zone, which stores a predetermined value of a counter and a correspondence table, with the correspondence table comprising a set of values of the parameter, each parameter value being associated with the value of a richness level, said computer being configured to implement the method as described above.

The invention also relates to a motor vehicle comprising:
  a combustion engine;
    a depollution system fluidly connected to the engine and configured to depollute the exhaust gases originating from said engine;
    a sensor placed between the outlet of the engine and the inlet of the depollution system and configured to measure a parameter relating to the oxygen level in the exhaust gases exiting the engine; and
  a computer as described above.

DESCRIPTION OF THE DRAWINGS

Further features and advantages of the invention will become more clearly apparent upon reading the following description. This description is purely illustrative and should be read with reference to the appended drawings, in which.

DESCRIPTION OF THE EMBODIMENTS

Vehicle

Figure 1:
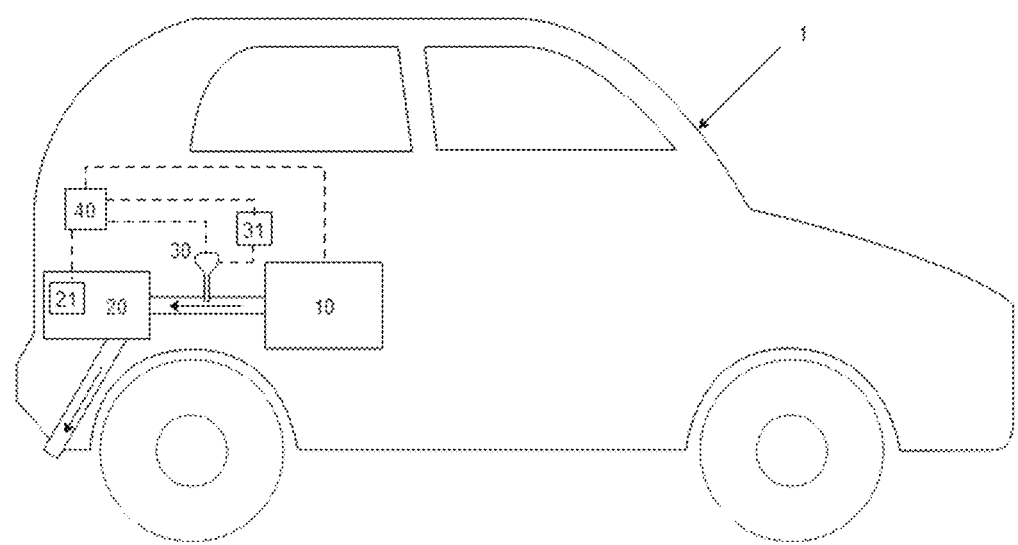
FIG. 1 is an illustration of the vehicle according to the invention.

With reference to FIG. 1, an embodiment of a vehicle 1 according to the invention will now be described.

In a known manner, the vehicle 1 comprises a combustion engine 10, a depollution system 20, a sensor 30 and a computer 40.

Engine

In a known manner, the combustion engine 10 allows the vehicle 1 to move. To this end, the combustion engine 10 produces mechanical energy from a mixture of fuel and air, and more specifically from the combustion of the mixture of fuel and air. This combustion also produces exhaust gases, notably comprising carbon dioxide, water, dioxygen, nitrogen, carbon monoxide, hydrocarbons and nitrogen oxides.

Depollution System

The depollution system 20 is fluidly connected to the combustion engine 10. More specifically, the depollution system 20 is connected to the combustion engine 10 via a pipe, notably a tubular pipe, allowing the exhaust gases emitted by the combustion engine 10 to move in the depollution system 20.

The depollution system 20 is configured to depollute the exhaust gases emitted by the combustion engine 10, in other words, to convert the polluting gases, notably the carbon monoxide, the hydrocarbons or the nitrogen oxides included in the exhaust gases, into gas that is harmless to the environment.

To this end, the depollution system 20 can notably comprise a particulate filter. The particulate filter allows, as its name suggests, the particles emitted in the exhaust gas to be filtered, so that these particles are not subsequently emitted into the environment of the vehicle 1.

The depollution system 20 can also comprise other systems, such as an "SCR" (Selective Catalytic Reduction) module and an oxidation catalyst.

The SCR module, which is known to a person skilled in the art, notably allows the amount of nitrogen oxide contained in the exhaust gases to be reduced. The oxidation catalyst, for its part, allows the carbon monoxide and the hydrocarbons present in the exhaust gases to be converted into substances that are harmless to the environment of the vehicle 1, by virtue of an oxidation method.

The depollution system 20 also comprises a temperature measurement device 21 capable of measuring the temperature inside the depollution system 20 and of transmitting each measured value to the computer 40.

Sensor

The sensor 30 is placed between the outlet of the combustion engine 10 and the inlet of the depollution system 20. More specifically, the sensor 30 is placed on the tubular pipe connecting the combustion engine 10 and the depollution system 20.

Even more specifically, the sensor 30 is placed between the outlet of the combustion engine 10 and the inlet of the particulate filter of the depollution system 20.

The second sensor 30 can be, for example, a sensor known to a person skilled in the art by the term "oxygen sensor" or "lambda sensor" or even "upstream sensor".

More specifically, the sensor 30 comprises a pumping cell. The sensor 30 is fluidly connected to the pipe connecting the combustion engine 10 and the depollution system 20 via said pumping cell. In other words, the exhaust gases moving between the combustion engine 10 and the depollution system 20 also circulate in the pumping cell of the sensor 30.

The sensor 30 is configured to measure a parameter relating to the oxygen level in the exhaust gases exiting the combustion engine 10 and, notably, in the exhaust gases circulating from the combustion engine 10 to the depollution system 20, via the pipe. The oxygen level in the exhaust gases also allows the oxygen concentration in the exhaust gases to be determined.

The parameter notably corresponds to a current, called "pumping current". The pumping current designates the current feeding the pumping cell when exhaust gases circulate in the pumping cell. More specifically, the pumping current is due to the movement of the oxygen, and, more specifically, of the oxygen ions, of the exhaust gases in the pumping cell.

The pumping current notably represents the difference between the oxygen level in the exhaust gases and a reference oxygen level. The reference oxygen level defines the oxygen level emitted in the exhaust gases by the combustion engine 10 following the combustion of a mixture of air and fuel, in which the amount of air is the necessary and sufficient amount relative to the amount of fuel for allowing complete combustion of the fuel.

The sensor 30 is also configured to send the at least one measured value of the first parameter relating to the oxygen level to the computer 40 over a communication link. The communication link notably is a CAN (Controller Area Network) data bus.

Voltage Measurement Device 31

In addition, the sensor 30 comprises two voltage measurement terminals or electrodes. More specifically, the pumping cell of the sensor 30 comprises a "reference" cell comprising the two voltage measurement terminals.

The sensor 30 also comprises a voltage measurement device 31 capable of measuring the voltage between the voltage measurement terminals of the sensor 30.

Computer 40

The computer 40 is configured to communicate with the sensor 30 via the communication link. The computer 40 is also configured to communicate with the temperature measurement device 21 and with the voltage measurement device 31.

Furthermore, the computer 40 is also configured to transmit instructions to the combustion engine 10.

The computer 40 comprises a memory zone, which stores a predetermined value of a counter.

In addition, a predefined correspondence table is stored in the memory zone of the computer 40. The correspondence table comprises, for each value of the parameter, in other words, of the pumping current, the value of an associated richness level.

The richness level is defined, for a predefined amount of air admitted into the combustion engine, by the ratio of the actual fuel mass injected into the combustion engine 10 to a theoretical fuel mass.

The theoretical fuel mass defines the necessary and sufficient amount of fuel to ensure total combustion of the fuel in the predefined amount of admitted air.

The richness level also can be defined by the ratio of the actual fuel mass injected into the combustion engine 10 to the actual air mass admitted into the combustion engine 10.

For example, when the pumping current is positive, or its value is relatively high, then the value of the richness level is less than 1. This means that the mixture of fuel and air injected into the combustion engine 10, before combustion of the mixture, comprises an actual fuel mass that is less than the theoretical fuel mass. The mixture of air and fuel previously injected into the combustion engine 10 is then said to be fuel-lean.

Conversely, when the pumping current is negative, or its value is relatively low, then the value of the richness level is greater than 1. This means that the mixture of fuel and air injected into the combustion engine 10, before combustion of the mixture, comprises an actual fuel mass that is greater than the theoretical fuel mass. The mixture of air and fuel previously injected into the combustion engine 10 is then said to be fuel-rich.

The computer 40 is configured to receive the value of the pumping current feeding the pumping cell and is configured to determine the value of the richness level on the basis of the value of the received pumping current.

The computer 40 is also configured to obtain the value of the voltage measured by the measurement device 31 between the voltage measurement terminals, and to determine the value of the richness level on the basis of the value of the received voltage.

The computer 40 is then capable of detecting measurement errors, and more specifically measurement relevance and/or plausibility, when the difference between the richness level values determined above is greater than a predefined maximum threshold or is less than a predefined minimum threshold.

The computer 40 is also configured to receive the value of the temperature in the depollution system 20, which value is measured by the temperature measurement device 21. In addition, the computer 40 is capable of determining whether the received value is greater than a predetermined temperature threshold, notably predefined at 350° C., and is thus capable of determining whether the depollution system 20 is operating within an effective temperature range.

The computer 40 is also configured to control the operation of the combustion engine 10.

For example, the computer 40 is configured to continuously increase the richness level setpoint from a minimum value to a maximum value.

"Continuously" refers to a set of richness level values defined by a step of 0.005 between the minimum value and the maximum value.

Notably, the minimum value is equal to 0.75 and the maximum value is equal to 1.25.

By way of a further example, when the computer 40 commands cleaning of the sensor 30, the computer 40 controls the operation of the combustion engine 10 by periodically varying the richness level setpoint from the minimum value to the maximum value. More specifically, the richness level setpoint corresponds to a square-wave signal alternating between a high state, the value of which is equal to the maximum value, and a low state, the value of which is equal to the minimum value.

The computer 40 is configured to receive, notably continuously, the values measured by the sensor 30, via the communication link. The computer 40 is also configured to determine a first variation in the richness level on the basis of the received values measured by the sensor 30, to which the computer 40 applied a predefined correction factor, and on the basis of the correspondence table.

The correction factor is notably predefined by the computer 40 itself, in order to rectify potential measurement errors made by the sensor 30, as a function of the environment.

The computer 40 is also configured to receive the values successively measured by the voltage measurement device 31. In other words, the computer 40 receives the variation in the voltage measured by the voltage measurement device 31. The computer 40 is also configured to determine a second variation in the richness level on the basis of the measurement of the variation in the received voltage.

The computer 40 is configured to increment the value of the counter upon each command to clean the sensor 30.

In the present case, the computer 40 is configured to cancel detection of the presence of errors in the sensor 30 if the difference between the first variation in the richness level determined on the basis of the parameter relating to the pumping current and the second variation determined on the basis of the variation in the voltage between the voltage measurement terminals of the sensor 30 is:
 a. less than a predefined maximum tolerance threshold; and
 b. greater than a predefined minimum tolerance threshold.

In the opposite case, and if the value of the counter is greater than a predefined maximum threshold of cleaning cycles, the computer 40 is capable of confirming a malfunction of the sensor 30. In addition, the computer 40 is capable of transmitting a warning signal to the user of the vehicle 1 to indicate a malfunction of the sensor 30, for example, by sending a light signal to the vehicle dashboard or an audible signal.

The computer 40 notably can be likened to a diagnostic device, commonly called an "OBD" (On-Board Diagnostic) device.

The computer 40 comprises a processor capable of implementing a set of instructions for carrying out these functions.

Method

Figure 2:
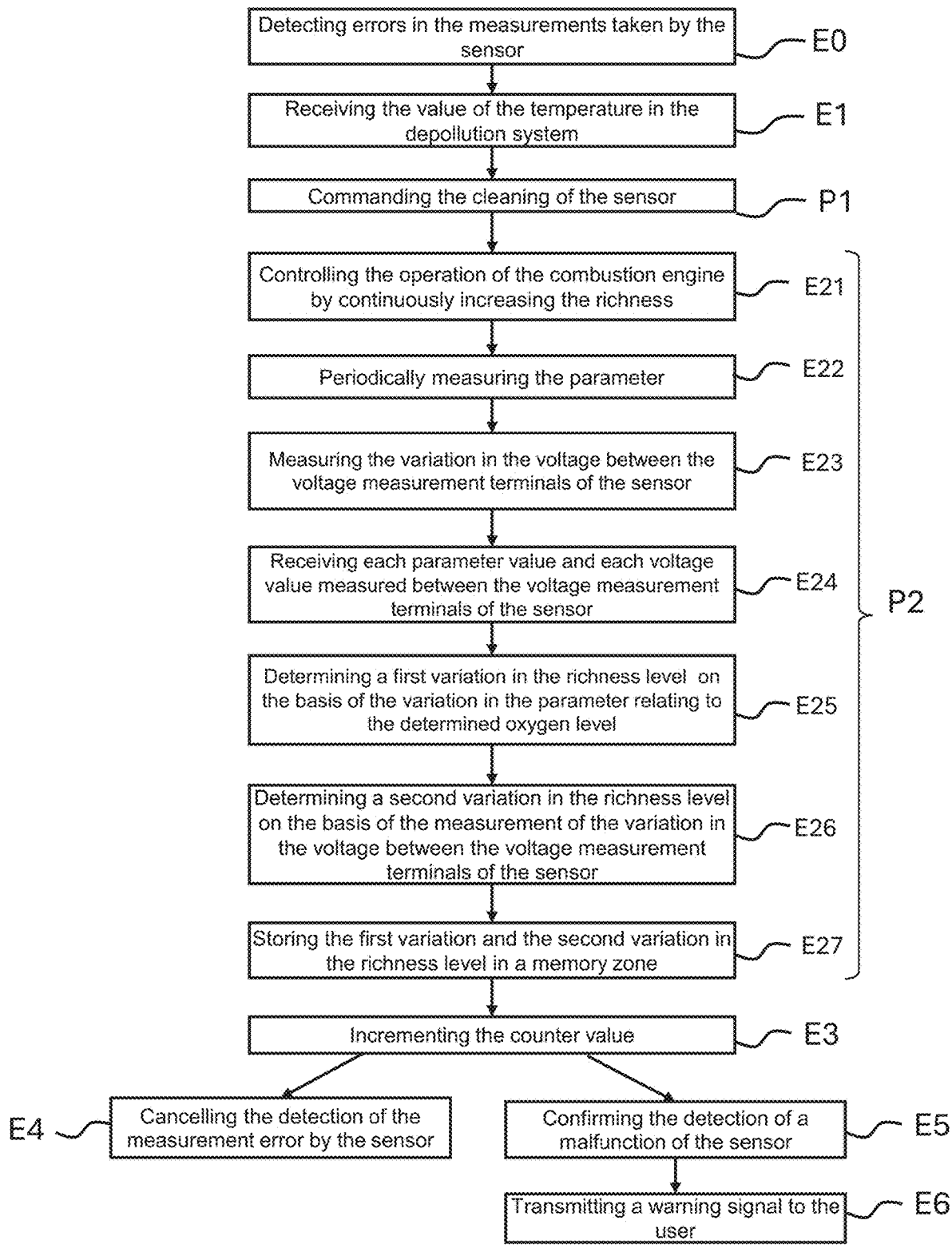
FIG. 2 illustrates the method according to the invention.

With reference to FIG. 2, the method for diagnosing a sensor 30 for a motor vehicle 1, implemented by the computer 40 as described above, will now be described.

The method is implemented after a new sensor 30 is installed in the vehicle 1. Notably, this can involve installing a sensor 30 in a vehicle 1 before it leaves the factory or changing said sensor 30 following the detection of a malfunction in the previous sensor installed in the vehicle 1. Preferably, the method is implemented when the vehicle is stationary, in a garage, for example.

The method firstly comprises a step E0 of detecting operating faults in the sensor 30. To this end, the computer 40 receives the value of the pumping current feeding the pumping cell and determines the value of the richness level on the basis of the received value of the pumping current. The computer 40 also receives the voltage between the voltage measurement terminals of the sensor 30, and, more specifically, of the reference cell of the sensor 30, and also determines the value of the richness level on the basis of the received voltage. The computer 40 detects a measurement error when the difference between the richness level values determined above is greater than a predefined maximum threshold or is less than a predefined minimum threshold.

The method also comprises a step E1 involving the computer 40 periodically receiving the value of the temperature in the depollution system 20, which value is measured by the temperature measurement device 21. The computer 40 then compares each received temperature value with the predetermined temperature threshold.

When the temperature in the depollution system 20 is higher than the predetermined temperature threshold, the method comprises a first phase P1 of commanding the cleaning of the sensor 30, during which phase the computer 40 controls the operation of the combustion engine 10 by periodically varying the richness level setpoint, sent to the combustion engine 10, from the minimum value to the maximum value, and vice versa.

For example, the richness level setpoint transitions from the minimum value to the maximum value, and vice versa, every second. In other words, the richness level setpoint is defined at its minimum value for 1 second, then at its maximum value for 1 second, and vice versa.

Following the first phase P1, the method comprises a second phase P2 of controlling the operation of the combustion engine 10.

Thus, the second phase P2 comprises a sub-step E21 of controlling the operation of the combustion engine 10 by continuously increasing the richness level setpoint from a minimum value to a maximum value. In other words, the computer 40 transmits a series of richness level setpoints to the combustion engine 10, for which setpoints the value of the richness level increases regularly.

For each received richness level setpoint, the combustion engine 10 adapts its operation so as to comply with the richness level setpoint.

The second phase P2 also comprises a sub-step E22 involving the sensor 30 periodically measuring the parameter at the same time as the control sub-step E21. In addition, each value measured by the sensor 30 is sent to the computer 40.

The second phase P2 also comprises a sub-step E23 of measuring the voltage between the voltage measurement terminals of the sensor 30 at the same time as the control sub-step E21, using the voltage measurement device 31. Each value measured by the voltage measurement device 31 is sent to the computer 40.

The second phase P2 therefore also comprises a sub-step E24 involving the computer 40 receiving each parameter value sent by the sensor 30 and each voltage value measured between the voltage measurement terminals of the sensor 30.

For each received parameter value, the second phase P2 comprises a sub-step E25 involving the computer 40 determining the richness level on the basis of said parameter value and the correspondence table stored in the memory zone. Thus, the computer 40 has determined the first variation in the richness level when the combustion engine 10 is running and notably when transmitting the sequence of richness level setpoints to the combustion engine 10.

For each received measured voltage value, the second phase P2 also comprises a sub-step E26 of determining the richness level on the basis of the received measured voltage value. Thus, the computer 40 determines a second variation in the richness level on the basis of the measurement of the variation in the voltage between the voltage measurement terminals of the sensor 30, using the voltage measurement device 31.

The second phase P2 then comprises a phase E27 of storing the first variation and the second variation in the richness level in a memory zone.

The method comprises a step E3 of incrementing the counter value each time the first phase P1 of commanding cleaning of the sensor 30 is carried out.

The method also comprises a step E4 of cancelling the detection of the measurement error by the sensor 30 if the difference between the first variation in the richness level determined on the basis of the parameter relating to the pumping current and the second variation determined on the basis of the variation in the voltage between the voltage measurement terminals of the sensor 30 is:
 a. less than a predefined maximum tolerance threshold; and
 b. greater than a predefined minimum tolerance threshold.

In other words, the detection of measurement errors by the sensor 30 is eliminated, this means that the sensor 30 has been cleaned and that the sensor 30 does not exhibit any operating problems, but that it was merely clogged.

Conversely, when the detection of measurement errors by the sensor 30 is not cancelled, the method comprises a step E5 of confirming the detection of a malfunction of the sensor 30 if the counter value is greater than a predefined maximum threshold of cleaning cycles, notably predefined between 2 and 10, preferably 5. Thus, in this case, this means that, despite the previous cleaning of the sensor 30, the operation of the sensor 30 has not changed. Therefore, it does not relate to a problem involving clogging of the sensor 30 but to an internal malfunction of the sensor 30.

The method can comprise, following the confirmation step E5, a step E6 of transmitting a warning signal to the user of the vehicle 1, notably by means of an audible or light signal on the dashboard, in order to inform the user to change the sensor 30 or to have it changed.

The invention claimed is:

1. A method for diagnosing a sensor for a motor vehicle, said vehicle comprising:
 a combustion engine;
  a depollution system fluidly connected to the engine and configured to depollute the exhaust gases originating from said engine;
  a sensor placed between the outlet of the engine and the inlet of the depollution system and configured to measure a parameter relating to the oxygen level in the exhaust gases exiting the engine, the sensor comprising two voltage measurement terminals;
  a computer comprising a memory zone, which stores the value of a counter;
the method comprising:
a) a step of detecting errors in the measurements taken by the sensor;
b) a first phase of commanding the cleaning of the sensor;
c) a step of incrementing the value of the counter upon each command to clean the sensor;
d) a second phase, following the cleaning of the sensor, comprising:
i) controlling the operation of the combustion engine by continuously increasing the richness level setpoint transmitted to the combustion engine from a minimum value to a maximum value, with the richness level being defined by the ratio between the mass of fuel admitted into the combustion engine and the theoretical fuel mass requirement for the total combustion of said fuel for a predefined air mass injected into the combustion engine;
ii) at the same time as the controlling step:
1) The sensor measuring the variation in the parameter relating to the oxygen level;
2) Measuring the variation in the voltage between the voltage measurement terminals of the sensor;
iii) a step of determining a first variation in the richness level on the basis of the variation in the parameter relating to the determined oxygen level;
iv) a step of determining a second variation in the richness level on the basis of the measurement of the variation in the voltage between the voltage measurement terminals of the sensor;
e) a step of cancelling the detection of measurement errors by the sensor if the difference between the first variation in the determined richness level and the second determined variation is:
i) less than a predefined maximum tolerance threshold; and
ii) greater than a predefined minimum tolerance threshold;
f) otherwise a step of confirming the detection of a malfunction of the sensor if the value of the counter is greater than a maximum threshold of predefined cleaning cycles.

2. The method as claimed in claim 1, wherein the first phase of commanding the cleaning of the sensor designates controlling the operation of the combustion engine by periodically varying the richness level setpoint from the minimum value to the maximum value.

3. The method as claimed in claim 1, wherein the second phase comprises a sub-step of storing the first variation and the second variation in the richness level in the memory zone.

4. The method as claimed in claim 1, wherein the first phase is implemented if the temperature in the depollution system is above a predetermined temperature threshold.

5. A non-transitory computer-readable medium on which is stored a set of program code instructions which, when executed by one or more processors, configure the one or more processors to implement the method of claim 1.

6. A computer for a vehicle, said vehicle comprising:
 a combustion engine;
  a depollution system fluidly connected to the engine and configured to depollute the exhaust gases originating from said engine;
  a sensor placed between the outlet of the engine and the inlet of the depollution system and configured to measure a parameter relating to the oxygen level in the exhaust gases exiting the engine;
the computer being configured to communicate with the sensor, said computer comprising a memory zone, which stores a predetermined value of a counter and a correspondence table, with the correspondence table comprising a set of values of the parameter, each parameter value being associated with the value of a richness level, said computer being configured to implement the method as claimed in claim 1.

7. A motor vehicle comprising:
 a combustion engine;
  a depollution system fluidly connected to the engine and configured to depollute the exhaust gases originating from said engine;
  a sensor placed between the outlet of the engine and the inlet of the depollution system and configured to measure a parameter relating to the oxygen level in the exhaust gases exiting the engine; and
 the computer of claim 6.

8. The method as claimed in claim 2, wherein the second phase comprises a sub-step of storing the first variation and the second variation in the richness level in the memory zone.

9. The method as claimed in claim 8, wherein the first phase is implemented if the temperature in the depollution system is above a predetermined temperature threshold.

10. A non-transitory computer-readable medium on which is stored a set of program code instructions which, when executed by one or more processors, configure the one or more processors to implement the method of claim 9.

11. A computer for a vehicle, said vehicle comprising:
   a combustion engine;
      a depollution system fluidly connected to the engine and configured to depollute the exhaust gases originating from said engine;
      a sensor placed between the outlet of the engine and the inlet of the depollution system and configured to measure a parameter relating to the oxygen level in the exhaust gases exiting the engine;
the computer being configured to communicate with the sensor, said computer comprising a memory zone, which stores a predetermined value of a counter and a correspondence table, with the correspondence table comprising a set of values of the parameter, each parameter value being associated with the value of a richness level, said computer being configured to implement the method as claimed in claim 9.

12. A motor vehicle comprising:
   a combustion engine;
      a depollution system fluidly connected to the engine and configured to depollute the exhaust gases originating from said engine;
      a sensor placed between the outlet of the engine and the inlet of the depollution system and configured to measure a parameter relating to the oxygen level in the exhaust gases exiting the engine; and
   the computer of claim 11.

* * * * *